Oct. 17, 1967     B. M. SHANNON     3,347,975
BUS DUCT HAVING HEAT DISSIPATING PARTS
Filed April 14, 1966     2 Sheets-Sheet 1
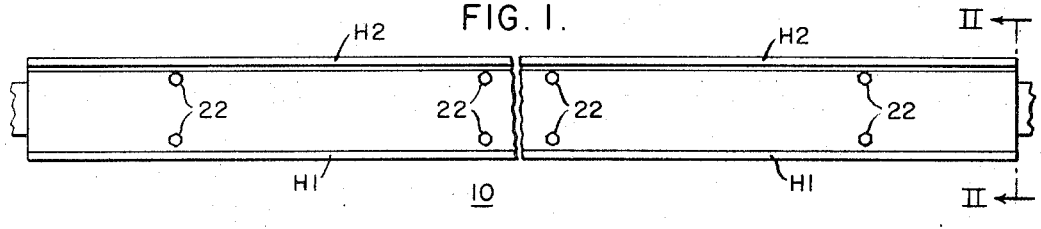
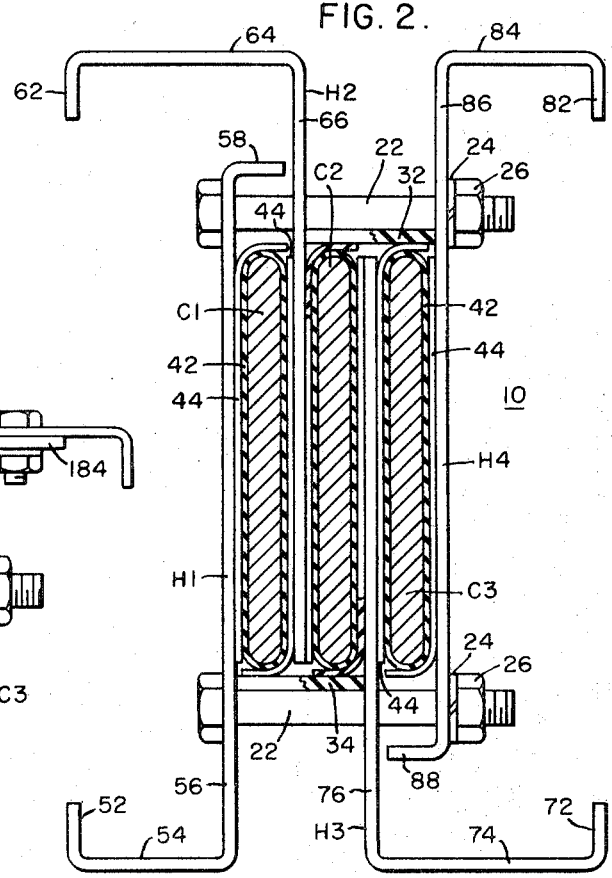
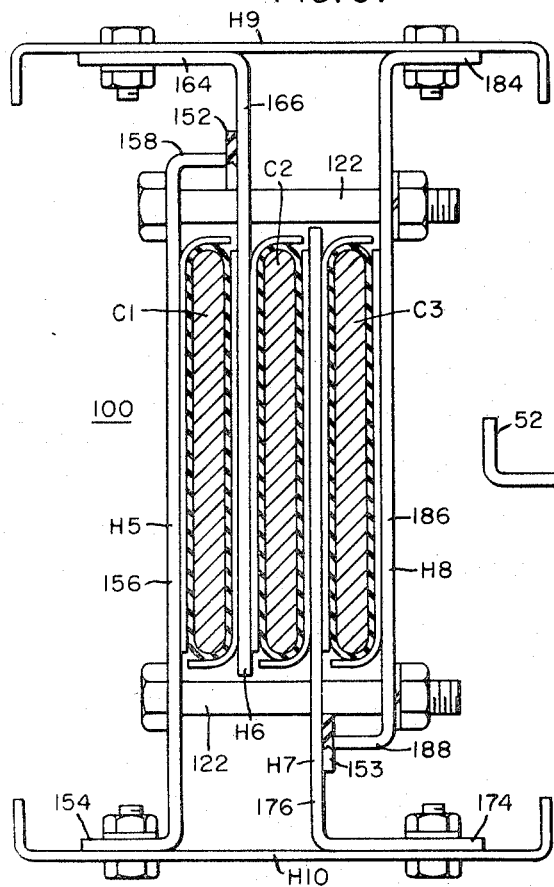
INVENTOR
Bill M. Shannon.
BY
Clement L. McHale
ATTORNEY Oct. 17, 1967  B. M. SHANNON  3,347,975
BUS DUCT HAVING HEAT DISSIPATING PARTS
Filed April 14, 1966  2 Sheets-Sheet 2
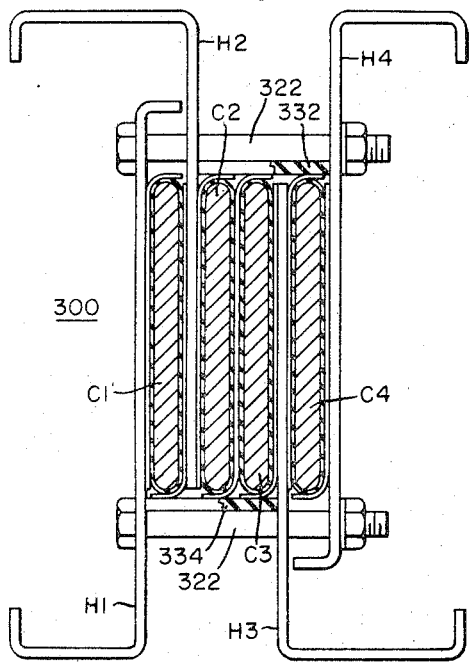
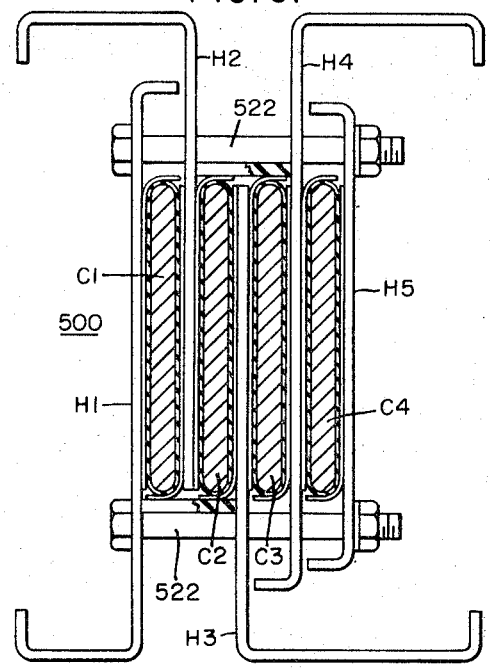
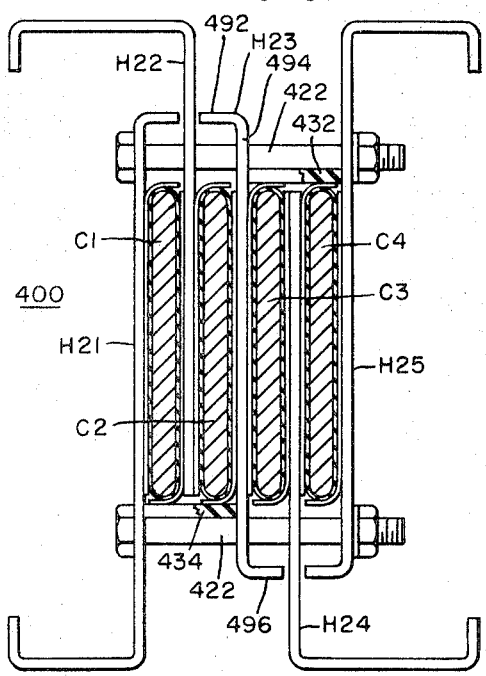

United States Patent Office 3,347,975
Patented Oct. 17, 1967

3,347,975
BUS DUCT HAVING HEAT DISSIPATING PARTS
Bill M. Shannon, Rochester, Pa., assignor to Westinghouse Electric Corporation, Pittsburgh, Pa., a corporation of Pennsylvania
Filed Apr. 14, 1966, Ser. No. 542,537
7 Claims. (Cl. 174—70)

This invention relates to electric power distribution apparatus and more particularly to bus duct structures.

In certain types of bus duct equipment which is employed to distribute electric power, it has been found desirable to closely space the bus bars included in such equipment in order to reduce the effective reactance of such equipment and the corresponding voltage drops which result when the equipment is carrying electric current. When the bus bars of such equipment are closely spaced, a problem arises in dissipating the heat which results in the bus bars during operation of the equipment, particularly when the equipment is carrying relatively large magnitudes of electric current, such as a thousand amperes or more. The problem of dissipating the heat from those bus bars which are disposed intermediate the outermost bus bars in the bus duct equipment of the type described may be particularly acute. For bus duct equipment having larger current ratings and closely spaced bus bars, the overall size of the equipment depends upon the ability of the equipment to adequately dissipate the heat which results in the bus bars during the operation of the equipment. It is, therefore, desirable to provide an improved bus duct construction which, on the one hand, permits relatively close spacing of the bus bars to reduce the effective reactance of the equipment and, on the other hand, provides improved means for dissipating the heat which results in the bus bars of the equipment, particularly for larger current ratings to permit a more compact construction of the equipment.

It is an object of this invention to provide a new and improved bus duct structure.

Another object of this invention is to provide a bus duct structure including improved means for dissipating the heat which results in the bus bars of the bus duct structure during the operation thereof.

A further object of this invention is to provide a more compact bus duct structure which is particularly adapted for larger current ratings.

Other objects of the invention will, in part, be obvious and will, in part, appear hereinafter.

For a fuller understanding of the nature and objects of the invention, reference should be had to the following detailed description taken in conjunction with the accompanying drawings, in which:

FIGURE 1 is a view, in side elevation, of a portion of a bus duct structure embodying the principal features of the invention;

FIG. 2 is a view, in section, taken along the line II—II in FIG. 1;

FIG. 3 is a view, similar to FIG. 2, of a modification of the invention which is particularly adapted to outdoor applications;

FIG. 4 is a view, similar to FIG. 2, of another modification of the invention;

FIG. 5 is a view, similar to FIG. 4, of an additional modification of the invention; and FIG. 6 is a view, similar to FIG. 2, of still another modification of the invention.

Referring now to the drawings and FIGS. 1 and 2 in particular, there is illustrated a bus duct structure 10 constructed in accordance with the teachings of the invention. In general, the structure shown in FIGS. 1 and 2 comprises a section or length of low impedance or feeder type bus duct which may be electrically connected in series at the opposite ends with like sections or lengths of bus duct in an overall bus duct system. The bus duct 10 includes a plurality of elongated, laterally spaced bus bars C1, C2 and C3 having generally flat sides which are formed from a suitable electrically conducting material, such as aluminum or copper. The bus bars C1, C2 and C3 are generally rectangular in cross-section with the longer sides of the adjacent bus bars being disposed in substantially parallel face-to-face relationship, as best shown in FIG. 2. In order to reduce the overall electrical impedance or reactance of the bus duct 10, the bus bars C1, C2 and C3 are spaced relatively closely together. Because of the close spacing, each of the bus bars C1, C2 and C3 is wrapped with electrically insulating tape or otherwise coated with electrical insulation, as indicated at 42 in FIG. 2. In addition, a pair of electrically insulating sheet members 44, which are generally L-shaped in cross-section, may be disposed around each of the bus bars C1, C2 and C3.

In order to enclose the bus bars C1, C2 and C3, the bus duct 10 includes a pair of outer housing members H1 and H4 which are disposed on the opposite sides of the assembled bus bars and a pair of intermediate housing members H2 and H3 which are disposed between the respective bus bars. Each of the housing members H1 through H4 is generally L-shaped in cross-section and is preferably formed from a non-magnetic, thermally conducting material, such as aluminum, to assist in dissipating the heat which results in the adjacent bus bars when the bus bars C1, C2 and C3 are carrying current during the operation of the bus duct 10. The outer housing members H1 and H4 include the relatively long portions 56 and 86, respectively, which are disposed substantially parallel to and in heat conducting relation with the outside surfaces of the adjacent bus bars C1 and C3, respectively. The outer housing members H1 and H4 project beyond the edges or ends of the associated bus bars in at least one direction and also include the relatively shorter transversely extending portions 54 and 84, respectively, to provide additional cooling surfaces for the heat which is conducted away from the associated bus bars. The other ends of the outer housing members H1 and H4 also include the transverse portions, as indicated at 58 and 88, respectively, which project toward the adjacent intermediate housing members H2 and H3, respectively, to substantially close off the openings that would otherwise exist at the ends of the bus duct 10 between the housing members H1 and H2 and between the housing members H3 and H4. Similarly, the intermediate housing members H2 and H3 include relatively long portions, as indicated at 66 and 76, respectively, with the long portion of the housing member H2 being disposed substantially parallel to and in heat conducting relation with both of the adjacent bus bars C1 and C2 and with the long portion 76 of the housing member H3 being disposed substantially parallel to and in heat conducting relation with both of the adjacent bus bars C2 and C3. In order to provide additional cooling surfaces for the bus duct 10, the intermediate housing members H2 and H3 project beyond the ends of the adjacent bus bars in at least one direction and include the relatively shorter transverse portions 64 and 74, respectively, which are disposed at the opposite ends of the bus duct 10 from the corresponding transverse portions of the adjacent outer housing members H1 and H4, respectively.

In order to adapt the housing members H1 through H4 to receive mounting brackets or supporting members (not shown) which may be required to support the bus duct 10 in a particular application, the housing members H1 through H4 include the vertically projecting portions, as indicated at 52, 62, 72 and 82 in FIG. 2, for the housing members H1 through H4, respectively. It is to be noted that the projecting portions 52 and 62 of the housing members H1 and H2, respectively, at one side of the bus duct 10 project toward one another and that the projecting portions 72 and 82 of the housing members H3 and H4, respectively, at the other side of the bus duct 10 similarly project toward one another as required for certain supporting arrangements.

In order to maintain the bus bars C1, C2 and C3 and the associated housing members in tightly assembled relationship, which is essential for efficient heat transfer between the bus bars C1, C2 and C3 and the associated housing members H1 through H4, suitable means, such as the clamping bolts 22, may be provided at the opposite ends of the bus bars C1, C2 and C3 as shown in FIG. 2. The bolts 22 pass through aligned openings in the associated housing members H1 through H4 and may be provided with suitable locking washers 24 and the nuts 26, with the bolts 22 being provided in spaced pairs along the length of the bus duct 10, as shown in FIG. 1.

In order to close off the openings that would otherwise be present between the housing members H1 and H3 at the lower end of the bus duct, as viewed in FIG. 2, and between the housing members H2 and H4 of the upper end of the bus duct 10, as viewed in FIG. 2, the electrically insulating sheet members 32 and 34 may be provided between the ends of the bus bars C2 and C3 and the upper clamping bolt 22 and between the lower ends of the bus bars C1 and C2 and the clamping bolt at the lower end of the bus duct 10. The insulating material indicated at 32 and 34 may also be provided in the form of an electrically insulating mat or an electrically insulating pitch material which may be employed to close off the otherwise exposed ends of the insulated bus bars C1, C2 and C3 at the opposite ends of the bus duct 10. It can be noted that the bus duct construction shown in FIG. 2 which employs electrically insulating material as part of the overall housing means of the bus duct 10 is particularly adapted for indoor applications.

In the operation of the bus duct 10, the heat which results in the bus bars C1, C2 and C3 during the operation of the bus duct 10 particularly when the respective bus bars are carrying relatively large currents is effectively dissipated by the thermally conducting housing members H1 through H4 which carry away the heat which results in the bus bars to the exposed cooling surfaces of the respective housing members, while still permitting the relative close spacing between the bus bars which results in a lower impedance or reactance. As previously mentioned, the housing members H1 through H4 are also conveniently adapted to receive mounting brackets or support members which may be required in a particular application of the bus duct 10. It is important that in the absence of the heat transfer paths provided by the intermediate housing members H2 and H3, the heat transfer paths between the inside surfaces of the bus bars C1, C2 and C3 and any housing structure which did not include such housing members would be substantially increased before such heat could be effectively dissipated or radiated by the exposed cooling surfaces of any housing structure which did not include such housing members.

Referring now to FIG. 3 there is illustrated a modified form of the invention in a bus duct 100 which is particularly adapted for outdoor applications. In general, the construction of the bus duct 100 is similar to that of the bus duct 10 except that the insulating sheet members 32 and 34 of the bus duct 10 are omitted and replaced by the channel-shaped cover members H9 and H10 which are disposed at the opposite ends of the bus duct 100.

More specifically, the bus duct 100 includes a plurality of closely spaced bus bars C1, C2 and C3 which are electrically insulated similarly to the corresponding bus bars of the bus duct 10. The housing members H5 through H8 of the bus duct 100 are generally L-shaped in cross-section and are formed from a suitable thermally conducting, non-magnetic material, such as aluminum. The relatively long portions 156 and 186 of the outer housing members H5 and H8, respectively, are disposed substantially parallel to and in heat conducting relation with the outer surfaces of the adjacent bus bars C1 and C3, respectively, while the relatively long portions 166 and 176 of the intermediate housing members H6 and H7, respectively, are disposed substantially parallel to and in heat conducting relation with both of the adjacent bus bars C1 and C2 and C2 and C3, respectively, as shown in FIG. 3. The relatively short transverse portions 154 and 184 of the outer housing members H5 and H8, respectively, are secured or fastened by suitable means, such as bolts, to the channel-shaped cover members H9 and H10, which are preferably formed from a suitable material having a predetermined structural strength, such as steel, while the relatively short portions transverse 164 and 174 of the intermediate housing members H6 and H7, respectively, are similarly secured or fastened to the channel-shaped cover members H9 and H10, respectively, by suitable means, such as bolts. It is to be noted that the cover members H9 and H10 close off the openings that would otherwise be present between the housing members H6 and H8 and H5 and H7, respectively, and that the cover members H9 and H10 are similarly adapted to receive mounting brackets or support members which may be required in a particular application of the bus duct 100.

In order to substantially seal off any clearance which might otherwise be present between the relatively short, transverse portions 158 and 188 of the housing members H5 and H8, respectively, and the adjacent housing members H6 and H7, respectively, the electrically insulating gasket members 152 and 153, respectively, may be provided and may be formed from a suitable resilient material, such as rubber.

It is to be noted that the bus bars C1, C2 and C3 of the bus duct 100 and the associated housing members H5 through H8 are maintained in tightly assembled relationship in order to insure good heat transfer between the respective bus bars and the associated housing members by suitable means, such as the clamping bolts 122, which are provided at the opposite ends of the bus bars C1, C2 and C3.

It is also to be noted that the transverse portions 154 and 164 of the housing members H5 and H6 are spaced away from the ends or edges of the associated bus bars C1 through C3 to provide additional cooling surfaces for the heat which is generated or results in the associated bus bars during the operation of the bus duct 100 and that the transverse portions 154 and 164 of the housing members H5 and H6 are disposed at opposite ends of the bus duct 100, as viewed in FIG. 3. Similarly, the transverse portions 174 and 184 of the housing members H7 and H8, respectively, are spaced away from the ends or edges of the associated bus bars C1 through C3 and disposed at opposite ends of the bus duct 100 to be secured or fastened to the associated cover members H9 and H10, respectively, by suitable means, such as bolts.

In the operation of the bus duct 100, the housing members H5 through H8 perform an important function similar to the corresponding housing portions of the bus duct 10 in assisting in dissipating the heat which results in the associated bus bars C1 through C3 when said bus bars are carrying currents during the operation of the bus duct 100.

Referring now to FIG. 4, there is illustrated another modified form of the invention in a bus duct 300 which is particularly adapted to four-wire electrical systems which include a neutral bus bar or conductor. In general, the construction of the bus duct 300 is similar to the construction of the bus duct 10 previously described in detail, except that the bus duct 300 includes an additional or fourth bus bar which is disposed between the housing members H2 and H3 of the bus duct 300. It is to be noted that the bus duct 300 includes the upper and lower insulating sheet members 332 and 334, respectively, as viewed in FIG. 4, which are disposed between the ends of edges of the associated closely spaced bus bars C1 through C4 and the upper and lower clamping bolts 322 of the bus duct 300. The insulating sheet members 332 and 334, therefore, serve to close off the openings that would otherwise be present between the housing members H2 and H4 at the upper end of the bus duct 300 and between the housing members H1 and H3, respectively, at the lower end of the bus duct 300 to form part of an overall housing structure in the bus duct 300 which includes the housing members H1 through H4 and the insulating sheet members 332 and 334. In the operation of the bus duct 300, the function of the housing members H1 through H4 is similar to the heat dissipating function of the housing members of the bus ducts 10 and 100 previously described. The heat which results in the closely spaced bus bars C1 through C4 of the bus duct 300 during the operation of the bus duct 300 is effectively dissipated by the heat dissipating or cooling surfaces of the associated housing members H1 through H4 of the bus duct 300.

Referring now to FIG. 5, there is illustrated another modified form of the invention in a bus duct 400 which is also previously adapted to four-wire electrical systems which include a neutral bus bar or conductor. In general, the bus duct 400 is similar to the bus duct 300 except that the bus duct 400 includes an additional housing member which is disposed generally between the two pairs of bus bars which are included in the bus duct 400 to provide additional heat dissipating means for the heat which results in the intermediate bus bars C2 and C3 of the bus duct 400.

More specifically, the bus duct 400 includes a plurality of closely spaced bus bars C1 through C4 which are electrically insulated in the same manner as previously described in connection with the bus duct 10 and includes a plurality of associated housing members H21 through H25 which are disposed in heat conducting relation with the respective bus bars and which are formed from thermally conducting non-magnetic material in similar fashion to the housing members of the different bus ducts previously described. The construction of the bus duct 400 is similar to that of the bus duct 10 previously described in detail except that the bus duct 400 includes the additional housing member H23 which is generally Z-shaped in cross section with the relatively long portion 494 of the housing members H23 being disposed substantially parallel to and in heat conducting relation with both of the adjacent bus bars C2 and C3 between which the relatively long portion 494 of the housing member H23 is disposed. In order to substantially close off the openings that would otherwise be present between the housing member H23 and the adjacent intermediate housing members H22 and H24, the relatively short transverse portion 492 of the housing member H23 projects toward the adjacent housing member H22 while the relatively short transverse portion at the other end of the housing member H23, as indicated at 496, projects toward the adjacent housing member H24. The bus duct 400 also includes the upper and lower electrically insulating sheet members 432 and 434, respectively, to close off the other openings that would otherwise be present between the housing members H23 and H25 and between the housing members H21 and H23, respectively. In operation, the bus duct 400 has the additional advantage over the bus duct 300 that the heat which results in the intermediate bus bars C2 and C3 is more effectively dissipated by the heat transfer paths which are provided from the inside surfaces of the bus bars C2 and C3 to the exposed external cooling surfaces of the intermediate housing member H23. Otherwise, the bus duct 400 possesses the same heat dissipating operating advantages as the bus duct 10 previously described.

Referring now to FIG. 6 there is illustrated another modified form of the invention which is particularly adapted for four-wire electrical systems in which a neutral bus bar or conductor is employed. In general, the bus duct 500 is similar in construction to the construction of the bus duct 10 previously described, except that a fourth or additional bus bar which may be added at either side of the bus duct structure is provided in the bus duct 500.

More specifically, the bus duct 500 includes a plurality of closely spaced bus bars C1 through C4 which are electrically insulated in the same manner as previously described in connection with the bus duct 10 and a plurality of associated housing members H1 through H5 which are disposed in heat conducting relation with the respective bus bars. The construction of the bus duct 500 is similar to the construction of the bus duct 10 previously described except that an additional or fourth bus bar C4 is disposed at one side of the bus duct 500 with the additional bus bar C4 being enclosed by an additional channel-shaped housing member H5 which is disposed substantially parallel to and in heat conducting relation with the outer surface of the additional bus bar C4. The additional housing member H5 is maintained in assembled relationship with the other portions of the bus duct 500 by the upper and lower clamping bolts 522 which also pass through aligned openings in the housing members H1 through H4 as well as through aligned openings in the additional housing member H5. It is to be noted that both sides of each of the bus bars C1 through C4 of the bus duct 500 are disposed in heat conducting relation with the adjacent respective housing members H1 through H5.

In the operation of the bus duct 500, the housing members perform the same important heat dissipating function as do the housing members of the bus duct constructions previously described. It is also to be noted that the construction of the bus duct 500 has the additional advantage that it may be formed by adding an additional bus bar to either side of the basic bus duct 10 shown in FIG. 2 where such an addition is desired for an existing bus duct installation.

It is to be understood that in certain applications other means may be employed to maintain the bus bars and the associated housing members in the different bus duct structures disclosed in tightly assembled relationship rather than the clamping bolts, as described previously. For example, an electrically insulating adhesive material, such as an epoxy resin, may be employed to bond the bus bars and the associated housing members which make up the different bus duct structures disclosed in tightly assembled relation with the need for the clamping bolts being thereby eliminated. Such a modified construction would still offer the same important heat dissipating operating advantages as the detailed bus structures previously described. It is also to be noted that the bus duct structures 300, 400 and 500 which are particularly adapted for indoor applications, as disclosed, may be modified similarly to the bus duct 100 for outdoor applications where desired. It is also to be understood that in the different bus duct structures disclosed that the outer housing member and the adjacent intermediate housing member at each side of the different bus structures may be reversed end to end in certain applications as long as the appropriate transverse portions of the outer housing member at each side of the bus structure are disposed at the opposite ends of the respectve bus duct structures from the corresponding transverse portions of the adjacent intermediate housing members in order that the different bus duct structures provide overall configurations which is adapted to receive associated mounting brackets or supporting members as required in the particular application.

The apparatus embodying the teachings of this invention has several advantages. For example, in a bus duct structure as disclosed, the advantages of low reactance or impedance which results from relatively close spacing of the bus bars may be combined with good heat dissipation of the heat which results during the operation of the respective bus duct structures, particularly when the bus bars are carrying relatively large magnitudes of current, such as 1,000 amperes or more. The applicant's disclosed bus structures permit either larger magnitudes of currents to be carried in bus bars of a given cross sectional area or permit a reduction in the size of the overall bus structure for a predetermined current rating of a particular bus duct structure since the heat which results in the bus bars is more effectively dissipated in the applicant's disclosed bus duct structures during the operation of such bus duct structures. The disclosed bus duct structures also offer the important advantage that the different bus structures provide relatively high resistance to short circuit stresses which may result during the operation of such bus duct structures.

Since numerous changes may be made in the above-described apparatus and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. A bus duct comprising at least three elongated, insulated bus bars disposed in laterally spaced relation, each of said bus bars being generally rectangular in cross section with the longer sides of the adjacent bus bars being disposed in substantially parallel face-to-face relation, a pair of outer housing members formed from thermally conducting material and disposed at the opposite sides of said bus bars, each of said outer housing members being generally L-shaped in cross-section and having a longer portion disposed generally parallel to and in heat conducting relation with the outer surface of the adjacent outside bus bar and a shorter transverse portion disposed transversely with respect to the longer portion, an intermediate housing member formed from thermally conducting material and disposed between each outside bus bar and the next adjacent bus bar, each intermediate housing member being generally L-shaped in cross-section with a longer portion disposed generally in parallel with and in heat conducting relation with both of the adjacent bus bars and with a shorter transverse portion disposed away from the shorter portion of the adjacent outer housing member, and means for maintaining the bus bars and the housing members in tightly assembled relationships.

2. The combination as claimed in claim 1 wherein the longer portions of the outer and intermediate housing members project beyond the ends of the adjacent bus bars in a direction toward the shorter portions of the respective housing members.

3. The combination as claimed in claim 1 wherein a pair of channel-shaped housing members are disposed adjacent to and spaced from the opposite ends of the bus bars, each of the channel-shaped housing members being secured to the adjacent shorter portions of one of the outer housing members and one of the intermediate housing members.

4. The combination as claimed in claim 1 wherein the bus duct comprises four bus bars and an additional intermediate housing member formed from heat conducting material and disposed between the two intermediate bus bars of the four bus bars, the additional housing member being generally Z-shaped in cross-section with a central portion disposed generally in parallel with and in heat conducting relation with both of the adjacent bus bars.

5. The combination as claimed in claim 1 wherein an additional bus bar is disposed in heat conducting relation with the outer surface of one of the outer housing members and an additional housing member having a generally U-shaped cross-section disposed in heat conducting relation with the additional bus bar on the side opposite from the adjacent outer housing member.

6. A bus duct comprising a plurality of longitudinally extending, electrically insulated bus bars disposed in closely spaced side-by-side relation, a pair of generally L-shaped outer housing members formed from thermally conducting material and disposed on opposite sides of the plurality of bus bars, each of the outer housing members having a long side disposed in heat conducting relation with the outer surface of the adjacent outside insulated bus bar and a short transverse side, and an intermediate generally L-shaped housing member having a long side disposed between each outside bus bar and the next adjacent bus bar in heat conducting relation with both of the adjacent bus bars and a short transverse side, the short side of each outer housing member being disposed away from the short side of the adjacent intermediate housing member and means for securing said bus bars and said housing members together in tightly assembled relationship.

7. The combination as claimed in claim 1 wherein the transverse shorter portions of the outer housing members are spaced away from the associated bus bars.

References Cited
UNITED STATES PATENTS

| | | |
|---|---|---|
| 2,350,601 | 6/1964 | Frank et al. |
| 2,439,471 | 4/1948 | Jackson. |
| 2,733,289 | 1/1956 | Warren et al. |
| 3,018,320 | 1/1962 | Rowe. |
| 3,088,994 | 5/1963 | Cataldo. |
| 3,187,086 | 1/1965 | Moodie et al. |
| 3,202,756 | 8/1965 | Stanback. |

LARAMIE E. ASKIN, *Primary Examiner.*